United States Patent [19]

Hochberg et al.

[11] 3,959,798

[45] May 25, 1976

[54] SELECTIVE WETTING USING A MICROMIST OF PARTICLES

[75] Inventors: Frederick Hochberg, Yorktown Heights; Keith S. Pennington, Somers, both of N.Y.

[73] Assignee: International Business Machines Corporation, Armonk, N.Y.

[22] Filed: Dec. 31, 1974

[21] Appl. No.: 537,801

[52] U.S. Cl. .............................. 346/74.1; 346/74 J

[51] Int. Cl.² .................... G01D 15/06; G11B 9/00

[58] Field of Search ............ 360/56; 346/74.1, 74 J, 346/74 EB, 74 ES; 117/17, 17.5; 101/DIG. 7, DIG. 8

[56] References Cited

UNITED STATES PATENTS

| | | | |
|---|---|---|---|
| 3,292,171 | 12/1966 | Wilson | 346/74.1 |
| 3,526,500 | 9/1970 | Opdycke et al. | 346/74 J |
| 3,566,786 | 3/1971 | Kaufer | 346/74.1 |
| 3,573,845 | 4/1971 | Gourdine | 346/74 J |

*Primary Examiner*—Alfred H. Eddleman
*Attorney, Agent, or Firm*—John A. Jordan

[57] ABSTRACT

Selective or controlled "wetting" of particles to the surface of a substrate or medium is effected by ultrasonically generating a micromist of small nebulized magnetic particles, typically of micron or submicron size. In the absence of a magnetic field, exposure of the surface of the substrate or medium to the micromist fails to produce any "wetting" of the particles to the surface. In the presence of a magnetic field, however, the particles are caused to locally "wet" the surface in accordance with the field pattern. Use of a micromist of magnetic ink particles for printing, typing and copying applications is described.

34 Claims, 4 Drawing Figures

SELECTIVE WETTING USING A MICROMIST OF PARTICLES

BACKGROUND OF THE INVENTION

1. Field of the Invention

The present invention relates to methods and apparatus for the selective application or deposition of particles to the surface of a substrate or medium therefor. More particularly, the present invention relates to methods and apparatus for controlling and effecting the selective application or deposition of an aerosol or mist of particles, such as magnetic ink particles, to the surface of a substrate or medium therefor for purposes of displaying, printing, copying, and the like, some form of data, information or the like.

2. Description of the Prior Art

Various techniques exist in the prior art for controlling the application or deposition of a cloud or mist of fine particles to a desired surface. Typically, such applications are used for printing, copying, coating, plating, reproducing, and the like. In the main, these techniques involve some form of electrostatic control wherein the particles of the cloud or mist are charged, and the passage of the charged particles to the desired surface is controlled, for example, by selective field deflection or precipitation of the particles out of the path to the intended surface. In other arrangements, selective application or deposition of particles is effected by electrostatic control of apertures leading to the intended surface by blocking or nonblocking fields thereacross.

Typical of the deflection or precipitation-type of electrostatic control is the printing arrangement described by R. E. McCurry et al in their article entitled "Mist Ink Printer" appearing in the IBM Technical Disclosure Bulletin, Vol. 15, No. 8, Jan. 1973. Typical of the blocking/nonblocking field-type electrostatic control of apertures is the printing arrangement described by Pressman in U.S. Pat. Nos. 3,625,604 and 3,694,200, and image reproduction arrangement described by Pressman et al in U.S. pat. No. 3,647,291.

Other techniques for electrostatically controlling the application or deposition of a cloud or mist of fine particles involve creating a latent electrostatic image on an insulating layer or substrate such that particles are selectively attracted and/or repelled in accordance with the polarity of the image. Representative of such arrangements are those described by Hotine in U.S. Pat. No. 3,537,847 and Rank Xerox Limited in British Patent 1,255,568. In Hotine, the electrostatic image is composed of both positive and negative charges while in Rank Xerox single polarity charges are employed.

Although not as widespread as the electrostatic forms of controlling application of fine particles to the surface of a substrate or medium therefor, some forms of magnetic control have been used. Magnetic control generally involves forming a jet or fine spray of magnetic particles and, as with the electrostatic case, deflecting the jet of particles out of the path to the intended surface via a magnetic field. In another scheme, the magnetic particles of the jet are inhibited from reaching the intended surface by using a magnetic field to control emission of the particles from the jet nozzle. Typical of the latter type control is that described by H. E. Hollmann in U.S. Pat. No. 3,925,312 entitled "Magnetic and Electric Ink Oscillograph."

In addition to the above-cited prior art, the following prior art describes, in one form or another, clouds, mists, sprays and the like of ink particles as used in recording, printing, reproducing and the like:

U.S. Pat. No. 2,191,827 by R. C. Benner et al for "Apparatus for Applying Liquid to Fabric;"

U.S. Pat. No. 2,584,695 by P. J. Good for "Electrostatic Reproduction Process and Apparatus;"

U.S. Pat. No. 2,716,826 by W. C. Huebner for "Apparatus for Reproducing Images;"

U.S. Pat. No. 3,725,951 by R. E. McCurry for "Electro-Ionic Printing".

One of the major difficulties with the prior art forms of controlling the selective application of particles to the surfaces of a substrate or medium therefor resides in the fact that the selective application is dependent upon significant physical control of the particles so as to effect or impede movement to or away from the substrate or medium. Such physical control introduces aerodynamic problems as well as imposing considerable corona requirements. In addition, the clogging of nozzles and the like, and general contamination are continuing problems. Moreover, because of the amount and intracacy of the control required, the control apparatus is necessarily complex, expensive and difficult to maintain.

SUMMARY OF THE INVENTION

In accordance with the principles of the present invention, selective application or deposition of particles to a substrate or medium therefor is effected by producing a micromist of fine nebulized magnetic particles of the order of 30 microns or less in size, and exposing the surface of said substrate or medium to said micromist. Since a micromist of particles of such size has been found to not "wet" the surface, no deposition of said particles occurs thereon. However, by selective application of magnetic fields at said surface, local "wetting" is induced thereby in accordance with the pattern or configuration of said fields. Accordingly, particle control is only required at the surface of the deposition medium with said control being relatively simple and minimal.

Where magnetic ink is the source of the particles of the micromist, simple, rapid and inexpensive printing, for example, may be carried out on conventional paper. Particles of the micromist which exhibit the "nonwetting" characteristic in the absence of an applied field range in size from submicron up to approximately 30 microns.

It is, therefore, an object of the present invention to provide an improved method and apparatus for selective application or deposition of particles to the surface of a substrate or medium therefor.

It is a further object of the present invention to provide a method and apparatus for effecting selective or controlled "wetting" of magnetic particles to the surface of a substrate or medium therefor.

It is yet still a further object of the present invention to provide an improved method and apparatus for controlling the application or deposition of magnetic ink and the like to a substrate of medium therefor for purposes of printing, typing, copying, displaying and the like.

It is another object of the present invention to produce a micromist of particles, such as nebulized magnetic ink particles, which do not "wet" the surface of the intended substrate or medium therefor until a magnetic field thereat acts to selectively induce local "wetting" and therefore local deposition.

The foregoing and other objects, features and advantages of the invention will be apparent from the following more particular description of preferred embodiments of the invention, as illustrated in the accompanying drawings.

DETAILED DESCRIPTION OF THE DRAWINGS

Each of the arrangements in FIGS. 1-4 embody the techniques and principles related to selective wetting for controlled application or deposition of particles to the surface of a substrate or medium therefor, in accordance with the present invention. In accordance with the principles of the present invention, each of these arrangements requires some form of micromist or aerosol generator. One possible arrangement for generating the required micromist is the commercially available DeVilbis nebulizer, shown generally at 1 in FIG. 1. Although the DeVilbis nebulizer is effective to produce micron and submicron size nebulized particles for selective wetting as required in accordance with the principles of the present invention, it should be understood that other forms of ultrasonic nebulization may, likewise, be as effective. Moreover, nebulizers other than the ultrasonic-type may, also, be employed. For example, the Babbington nebulizer, known to those skilled in the art, has been found effective to produce micron and submicron size nebulized particles.

Figure 1:
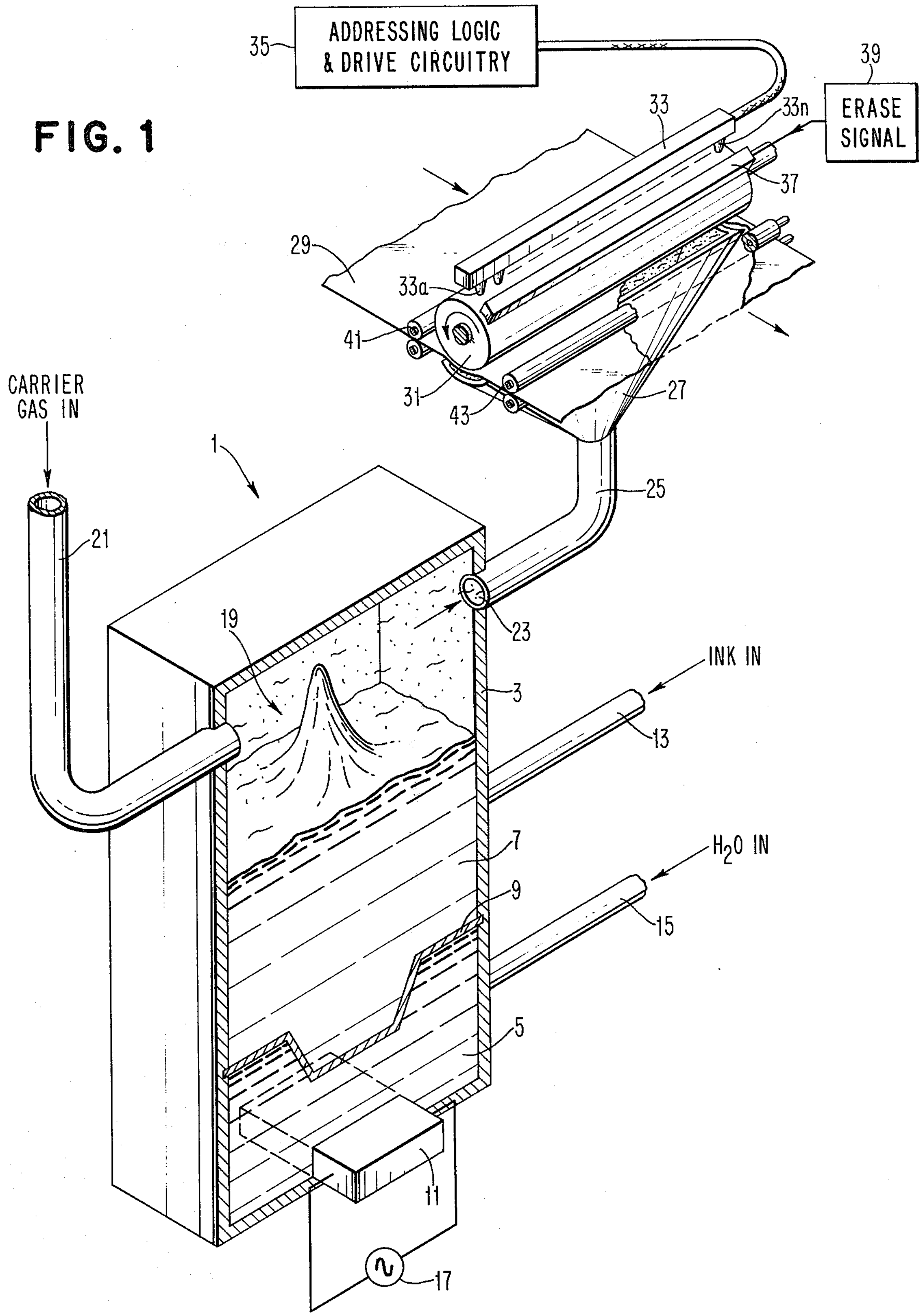
FIG. 1 shows one embodiment in the form of a line printer arrangement, in accordance with the principles of the present invention.

As shown in FIG. 1, the DeVilbis nebulizer 1 comprises housing 3, the lower portion of which is filled with liquid bath 5. Liquid bath 5, such as a water bath, is separated from ink 7 by polymer membrane 9. Piezoelectric transducer 11 is submerged in the water bath 5. Ultrasonic energy from transducer 11 is coupled to magnetic ink 7 via water bath 5 and polymer membrane 9. Ink and water may be replenished at 13 and 15, respectively.

The piezoelectric transducer is driven by source 17, having a frequency of the order of 1 MHz. Typically, a 1.3 MHz signal has been found effective to produce the micron and submicron size nebulized particles, required in accordance with the principles of the present invention. As is evident, the ultrasonic vibrations from transducer 11, when coupled through water bath 5 and membrane 9, act to excite or energize magnetic ink 7 with sufficient vibrational intensity so as to produce nebulized magnetic ink particles of the micron and submicron order of magnitude size in the open space of ink chamber 19. A carrier gas, such as $N_2$ or air, is fed into this open space via 21. The carrier gas acts to carry the nebulized ink mist out of the open space of ink chamber 19 via port 23. As is understood by those skilled in the art, any of a variety of carrier gases may readily be employed for this purpose. Likewise, as is understood by those skilled in the art, any of a variety of inks may be employed for ink 7.

In the embodiment of FIG. 1, ink 7 comprises a magnetic ink of the commercially available variety. Typically, any of a variety of well known ferrofluids may readily be employed, such as a 200 or 400 gauss water-based ferrofluid.

The carrier gas entering inlet tube 21 acts to continuously carry the micromist of nebulized magnetic ink particles out through port 23 and through outlet tube 25 to funnel 27 where the micromist fans out before it comes into contact with paper 29. As can be seen, the funnel is designed to span the width of the paper so that, instantaneously, a segment of the paper corresponding to its width is exposed to the micromist of particles.

As is evident, as the paper traverses in the direction shown by the arrow, more paper is exposed to the micromist. In this regard, the feed rate of the paper is not critical and good printing results may be achieved at rates of 5 inches/sec. or greater. Likewise, the flow rate of the carrier gas is not critical, the only requirement being that it be sufficiently low so that the micromist arrives at paper 29 with minimal or sufficiently low velocity such as to avoid wetting by excessive impact. In this regard, it is to be understood that "exposure" of the substrate or medium to a micromist of particles, as used herein, means subjecting the substrate or medium to a micromist of particles which arrive at nonwetting velocities in the absence of a magnetic field. The velocity at which wetting begins can readily be determined experimentally by increasing the carrier gas flow rate. As a typical example, a micromist of approximately 3 micron size particles exposing a medium such as paper, having a feed rate of 5 inches/sec, to particle velocities as high as 30 cm./sec will not wet the substrate or medium in the absence of a magnetic field thereat.

Paper 29 in FIG. 1 may be any of a variety of types and grades of paper. Typically, rolls of conventional printing paper may be used. As hereinabove explained, although paper 29 is continuously exposed to the micromist of magnetic ink particles, the ink particles fail to wet the paper in the absence of a magnetic field. This nonwetting occurs with a micromist of particles varying in size from submicrons up to approximately 30 microns. Typically, the more effective results are achieved with particle sizes ranging from submicrons up to three microns. Although the reasons for the nonwetting phenomena are not completely understood, it is believed that the high degree of surface tension associated with the very small particle sizes is one of the primary factors, together with the ability of these small particles to follow the flow lines of the gas in the neighborhood of medium surface and thereby avoid contact with the surface. The fact that the nonwetting effect is exhibited with a large variety of substrates or media further supports the belief that it is related to such factors.

Although the micromist of nebulized magnetic particles will normally not wet paper or other media exposed thereto in a field-free environment, selective wetting may readily be induced by creating a magnetic field in the vicinity of the media. Thus, where, as in FIG. 1, droplets of nebulized magnetic ink are formed, the presence of a magnetic field gradient across or in the neighborhood of the media, such as paper 29, results in local wetting or deposition of the droplets of ink.

Although the effect of the magnetic field is not completely understood, it is suggested that there may be an increased density of the nebulized particles in the presence of the field gradients thereof such that there is an increased possibility of particle coagulation. This would result in larger droplets with smaller surface tension and an increased probability of wetting. It is also suggested that the presence of the fields may act to increase the time the particles are in contact during collision thereby increasing the probability of both coagulation and wetting. Also, the presence of the fields may act to increase the velocity of the nebulized particles toward the medium resulting in impregnation and hence wetting of the media with the particles.

In the line-type printer arrangement of FIG. 1, the nebulized magnetic particles of the micromist to which paper 29 is continuously exposed, may be made to locally wet the paper by selectively creating a magnetic field pattern on the side of the paper opposite the micromist. This is achieved by employing a magnetic drum 31 and a multiple track write head 33. Addressing logic and driving circuitry 35 selectively addresses particular ones of the recording heads 33*a*-33*n* in accordance with the desired pattern or character to be printed. The magnetic heads magnetize drum 31 in accordance with the lines of information to be printed and the magnetic drum, in turn, rotates behind the paper to create the magnetic field pattern required to cause selective local wetting of the micromist of magnetic ink particles in accordance with the information to be printed. Erase head 37 acts to erase the information recorded on drum 31 so that new information may be recorded. As is evident, new information may be continuously recorded or, alternatively, the information recorded on drum 31 can be used repeatedly, so that multiple copies of this information are made.

Figure 2:
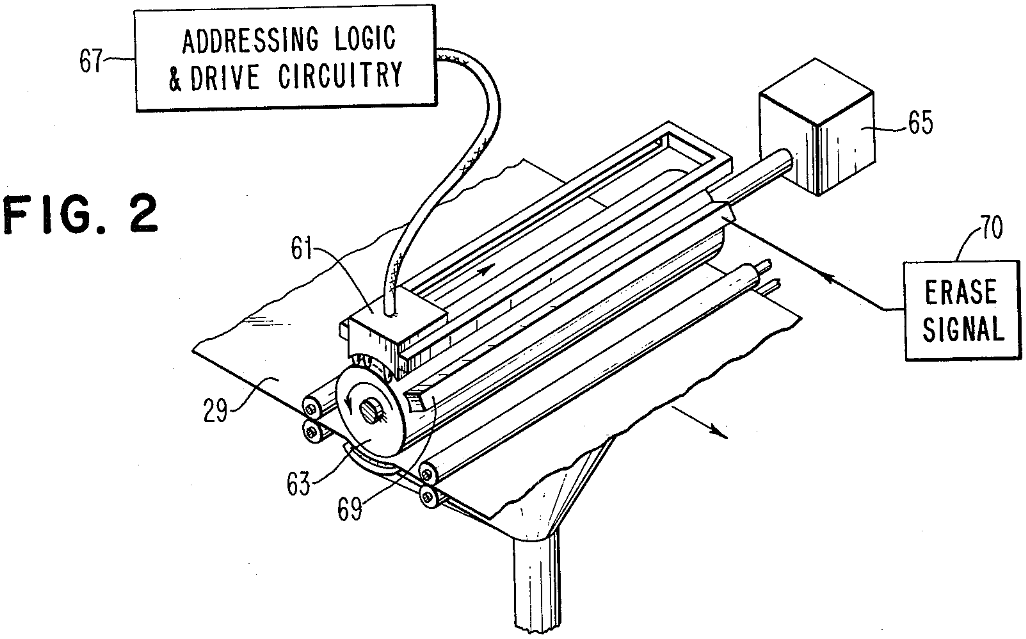
FIG. 2 shows an embodiment, akin to FIG. 1, in the form of a serial printer arrangement, in accordance with the principles of the present invention.

As is understood by those skilled in the art, the information to be recorded, in either FIG. 1 or FIG. 2, may be recorded on other than a magnetic drum. For example, drum 31 in FIG. 1 may be eliminated, and rollers 41 and 43 utilized to hold an endless tape or belt. This is shown more clearly in FIG. 4 wherein belt 45 is rotated on rollers or drums 47 and 49. Write head 51 may be a multiple track write head running the width of the tape or belt, such as shown in FIG. 1. The belt or tape 45 may, in turn, correspond in width to the width of the paper 29 within which it comes into contact. The multiple heads of write head 51 may be staggered in order to increase the density of recording on tape or belt 45 in those cases where the mechanical and/or electrical constraints do not permit close packing of the heads at the required recording densities.

Figure 4:
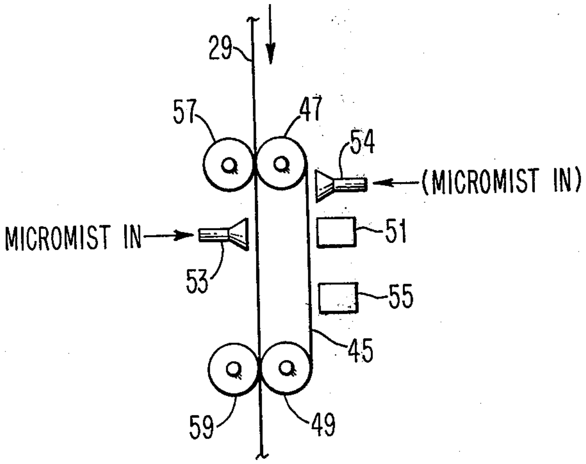
FIG. 4 shows an embodiment wherein a magnetic tape or belt is used rather than a magnetic drum as used in FIGS. 1 and 2.

In FIG. 4, the micromist may be deposited directly onto paper 29 from micromist head 53, in a manner similar to FIG. 1. Alternatively, the micromist may be deposited onto tape or belt 45 from micromist head 54, and thereafter be transferred to paper 29. In the latter case, write head 51 acts to write information or patterns onto the magnetizable tape or belt. The magnetized tape, moving in the direction shown by the arrow, then passes micromist head 54. When micromist head 54 is on, the tape is exposed to the micromist of magnetic ink particles. In this regard, the micromist may be lightly sprayed onto the tape or belt through a slit in micromist head 54 running the width of the tape or belt. The micromist only wets the local regions on the tape which have been magnetized. The wetted pattern of magnetic ink particles is then moved around and transferred to paper 29 via the pressure rollers 57 and 59. Erase head 55 may then, if desired, erase the written information or patterns. Cleaning means may also be used to remove unused ink.

If micromist head 54 is off and head 53 is on, tape or belt 45 acts to induce direct deposition onto paper 29. Alternatively, if desired, identical deposition may be effected on both sides of the paper by having both micromist heads on. It is evident, that other arrangements are possible for causing deposition of different patterns on each side of paper 29.

It is clear, that FIGS. 1 and 4 only represent some of the ways in which the selective wetting, in accordance with the principles of the present invention, may be embodied. For example, it is evident that amorphous magnetic bubble domain material may readily be employed as the medium upon which information is magnetically recorded. Selective wetting could be effected directly upon the bubble domain material or alternatively, the bubble domain material could be employed to induce selective setting upon another medium, such as paper. It is also evident, that rather than employ the write heads to record upon a magnetic medium, the write heads themselves could be employed directly behind the paper to induce local selective wetting. In such an arrangement, a one or two dimensional array of electromagnetic recording heads could be employed, and the paper moved with respect thereto. Alternatively, the paper could be stationary and a magnetic head or heads moved behind the paper. Likewise, both the paper and the head, or heads, could be moved with respect to one another.

Although reference has been made to the use of magnetizable media and magnetic heads behind the substrate or medium upon which selective wetting is to be effected, it is clear that selective wetting or deposition can also be achieved by employing selectively addressable magnetic devices adjacent the paper between the paper and the nebulized magnetic ink, i.e., in front of the paper. For example, an array of selectively addressable solenoids may be employed in front of and adjacent to the paper or the like, so as to accelerate the droplets of magnetized ink toward the head, such that selective local wetting is effected upon the paper.

FIG. 2 shows an alternative scheme to the line printer arrangement of FIG. 1. In the serial or facsimile printer of FIG. 2, write head 61 moves across magnetic drum 63 in the direction indicated by the arrow. The micromist of nebulized magnetic ink particles may be generated in the same manner as that described with reference to FIG. 1. As with FIG. 1, a segment of paper 29 corresponding to its width is exposed to the micromist. However, as is evident, the paper does not continuously feed through the rollers, but rather is intermittently fed a segment or frame at a time in synchronism with the cycling of write head 61.

Thus, after write head 61 reaches the end of drum 63 after having written a line, drum incrementer 65 moves the drum to a new line position during the time that head 61 returns to the beginning of the new line. Addressing logic and drive circuitry 67 then commences to write a new line upon drum 63. As can be seen, the multiple recording heads in write head 61 are arrayed orthogonal to the direction of motion of the write head. When the new line has been written, drum incrementer 65 again rotates the drum to a new line. Selective wetting of the nebulized magnetic ink particles is effected in the same manner as described with regard to FIG. 1.

Erase head 69 erases the recorded information in response to erase signal 70. The addressing logic and drive circuitry of the printers of both FIGS. 1 and 2, as well as that typically utilized in the arrangement of FIG. 4, is well known to those skilled in the art, and the details of such logic and drive circuitry are not considered essential to an understanding of the controlled wetting and selective deposition, in accordance with the principles of the present invention.

Figure 3:
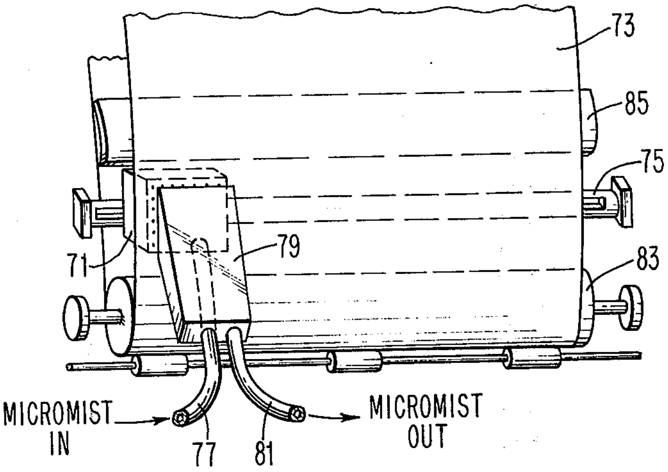
FIG. 3 shows a further embodiment in the form of a typewriter arrangement, in accordance with the principles of the present invention.

FIG. 3 shows a typewriter arrangement exemplifying the case wherein the write head moves behind the paper while the paper is stationary and wherein the head itself acts to induce local wetting. As shown, write head 71 of the typewriter is comprised of an MxN matrix array of electromagnets positioned directly behind paper 73. The write head may be fabricated to be sufficiently smooth such that the head is permitted to make contact with paper 73 without causing any deleterious physical effect to the paper. The number of electromagnets utilized in the array is a matter of design choice and is dependent upon such factors as the size of the electromagnets employed, the particular scheme employed to form the characters, the degree of resolution desired, and the like. In this regard, the same can be said for FIGS. 1, 2 and 4, i.e., the number of electromagnets employed is a matter of design choice.

As with FIGS. 1 and 2, the addressing logic and drive circuitry which would typically be utilized in FIG. 3 to address the appropriate electromagnets, corresponding to the desired character to be formed, is well known and understood by those skilled in the art, and is not required for an understanding of the essential principles and features of the present invention. Suffice it to say here, that such logic and drive circuitry would act, in response to depression of a typewriter key corresponding to the selected character, to address appropriate electromagnets in write head 71 to form that character.

As shown in FIG. 3, write head 71 rides on rack 75. At some point toward the completion of each key stroke, write head 71 is advanced to the next type position. Mechanisms for incrementally advancing head 71 across the paper on rack 71 are well known in the typewriter art, the details of which are not a part of the present invention. Typically, in conventional typewrite configurations, the carriage is incrementally advanced with each keystroke. This same carriage mechanism may be employed in the arrangement of FIG. 3 to advance quite simply write head 71 while the remainder of the typewriter apparatus, such as rack 75, roller 83 and plate 85, remain stationary.

To bring the micromist of nebulized magnetic ink particles to the vicinity of write head 71, a tube arrangement 77 is employed. As can be seen, the tube acts to direct, with slight velocity, the micromist of particles onto the front surface of paper 73. As described with respect to FIG. 1, such velocity is not critical, and the particles may be directed upon the surface of the paper up to the velocity which is still nonwetting in the absence of a magnetic field. If desired, tube 77 may be slightly flutted to spread the micromist. The mist may be generated in the same manner as described with regard to FIG. 1. To contain the micromist, a transparent tappered box 79 is employed. An exhaust tube 81 may be employed, under a slight vacuum, to remove unused micromist for recycling. It is evident that other schemes for containing the mist are possible.

Although FIGS. 1 – 4 show arrangements wherein a micromist of magnetic ink particles is used to selectively wet a substrate or medium such a paper for purposes of printing and the like, it should be understood that the selective wetting effect in accordance with the principles of the present invention may be implemented in any of a variety of applications. In this regard the substrate or medium need not be paper, nor does the micromist of magnetic particles necessarily need be ink particles. For example, the micromist of magnetic particles may be used for selectively depositing or coating metallurgy on a dielectric substrate, or for plating purposes. It is clear, that the magnetic particles may also be used as a carrier to selectively deposit other materials, such as polymers or metals, along with the magnetic particles.

Likewise, the micromist of magnetic particles may be used as a testing tool in magnetic recording environments wherein a micromist of contrasting color magnetic particles, such as magnetic ink particles, is used to make visible the pattern of information recorded on tapes, drums or cards. Since the rate of ink deposition is a function of the recorded field strength, simple optical techniques can then be used to characterize this strength. In similar fashion, resolution, tape or head defects, and the like, may be optically detected. It is clear that display applications are also possible.

Likewise, magnetic copying applications are readily possible, including color copying. In one simple example, the magnetic drum of FIG. 1 could be addressed by a relatively high density array of small electromagnets responsive to signals from an optically scanned image. It is clear that with such an arrangement, multiple copies can be made without refreshing the written image.

It should be appreciated that the printing, typing, copying, displaying and the like arrangements, operated in accordance with the principles of the present invention, require little power and no fusing of the ink to the substrate or medium. Moreover, in those applications where selective deposition is made directly onto the substrate, no cleaning of the magnetic medium is required. Relatively high resolution is achieved from a simple and effective structure which operates to utilize ink only on demand.

While this invention has been particularly shown and described with reference to the preferred embodiments thereof, it will be understood by those skilled in the art that various changes in form and details may be made therein without departing from the spirit and scope of the invention.

What is claimed is:

1. A process for selectively depositing particles on a medium therefor, comprising the steps of:

generating a magnetic micromist of particles, said micromist of particles including a carrier gas for carrying said particles, said particles being of sufficiently small particle size so as to fail to wet said medium when said medium is exposed thereto;

exposing said medium to said micromist so that said micromist fails to wet said medium in the absence of a magnetic field gradient thereat; and providing a magnetic field gradient at said medium so as to thereby cause said micromist to locally wet said medium in accordance with said field gradient.

2. The process of claim 1 wherein said step of generating a magnetic micromist of particles comprises generating a magnetic micromist of particles having a particle size in the submicron to 30 micron range.

3. The process of claim 2 wherein said step of generating a magnetic micromist of particles comprises generating a magnetic micromist of particles having a particle size within an order of magnitude of three microns.

4. The process of claim 2 wherein said step of generating a magnetic micromist of particles comprises generating a magnetic micromist of particles having a particle size in the submicron to three micron range.

5. The process of claim 2 wherein said particles to be deposited are magnetic particles and said step of generating a magnetic micromist of particles comprises generating a micromist of nebulized magnetic particles.

6. The process of claim 5 wherein said particles to be deposited are magnetic ink particles and said step of generating a micromist of nebulized magnetic particles comprises generating a micromist of nebulized magnetic ink particles.

7. The process of claim 6 wherein said step of providing a magnetic field gradient at said medium includes providing multiple magnetic field gradients selectively producible at said medium so as to be able to form patterns thereby.

8. The process of claim 7 wherein said medium is paper and said step of providing multiple magnetic field gradients at said medium comprises providing said multiple magnetic field gradients on the side of said paper opposite to the side thereof exposed to said micromist.

9. The process of claim 8 wherein said step of providing multiple magnetic field gradients on the side of said paper opposite to the side thereof exposed to said micromist comprises providing said multiple magnetic field gradients by selectively magnetizing a magnetizable medium with individually addressable magnetic write heads to form a pattern thereon and causing said magnetizable medium to come into contact and move with said paper to thereby effect local deposition of said micromist on said paper in accordance with said pattern.

10. The process of claim 8 wherein said step of providing multiple magnetic field gradients on the side of said paper opposite to the side thereof exposed to said micromist comprises providing said multiple magnetic field gradients by selectively magnetizing individually addressable magnetic write heads to form a pattern thereby and causing said write heads to effect local deposition of said micromist on said paper in accordance with said pattern.

11. The process of claim 7 wherein said medium is a magnetizable medium and said step of providing multiple magnetic field gradients at said medium comprises addressing said magnetizable medium with selectively addressable magnetic write heads to form patterns thereon whereby as said magnetizable medium is exposed to said micromist local deposition of said micromist on said magnetizable medium is effected in accordance with said pattern.

12. The process of claim 11 including the steps of providing paper and transferring said pattern from said magnetizable medium to said paper.

13. Apparatus for selectively depositing particles comprising:

substrate means upon which said particles are to be selectively deposited;

means for generating a magnetic micromist of said particles including means for providing a carrier gas for carrying said particles with said particles being of sufficiently small particle size so as to fail to wet said substrate means in the absence of a magnetic field thereat when said substrate means is exposed thereto; and means to selectively provide a magnetic field gradient at said substrate means to thereby cause said micromist to locally wet said substrate means in accordance with said magnetic field gradient.

14. The apparatus as set forth in claim 13 wherein said small particle size is in the submicron to 30 micron range.

15. The apparatus as set forth in claim 14 wherein said small particle size is within an order of magnitude of 3 microns.

16. The apparatus as set forth in claim 14 wherein said small particle size is in the submicron to three micron range.

17. The apparatus as set forth in claim 14 wherein said particles are magnetic ink particles and said means for generating a magnetic micromist of said particles comprises means for generating a micromist of nebulized magnetic ink particles.

18. The apparatus as set forth in claim 17 wherein said means to selectively provide a magnetic field gradient include magnetic write head means comprising multiple electromagnets individually addressable.

19. The apparatus as set forth in claim 18 wherein said means to selectively provide a magnetic field gradient is on the side of said substrate means which is opposite to the side thereof exposed to said micromist.

20. The apparatus as set forth in claim 19 wherein said substrate means is paper.

21. The apparatus as set forth in claim 20 wherein said paper is movable.

22. The apparatus as set forth in claim 21 wherein said means to selectively provide a magnetic field gradient include magnetizable media means and wherein said magnetic write head means is selectively addressed to magnetically write on said magnetizable media means.

23. The apparatus as set forth in claim 22 wherein said magnetizable media means is on the side of said paper which is opposite to the side thereof exposed to said micromist and is in contact therewith.

24. The apparatus as set forth in claim 23 wherein said magnetic write head means is movable.

25. The apparatus as set forth in claim 18 wherein said substrate means are magnetizable media means selectively addressable by said magnetic write head means so as to form magnetic patterns therein which are directly exposed to said micromist to form micromist patterns thereon in accordance with the magnetically written patterns therein.

26. The apparatus as set forth in claim 25 wherein means are provided to transfer said micromist patterns written upon said magnetizable media means to paper.

27. The apparatus as set forth in claim 21 wherein magnetic write head means is movable.

28. The apparatus as set forth in claim 27 wherein the said multiple electromagnets of said magnetic write head means are arranged to be selectively addressable so as to create said field gradient in the forms of patterns adjacent said paper to thereby induce wetting of said micromist onto said paper in the form of said patterns.

29. Apparatus for selectively depositing magnetic ink particles onto a substrate, comprising:

means to produce a micromist of said magnetic ink particles including means for providing a carrier gas for carrying said particles with said micromist having particle sizes within the submicron to 30 micron range so that said particles fail to wet said substrate in the absence of a magnetic field thereat;

means to cause said substrate to be exposed to said micromist of magnetic ink particles; and means to produce a magnetic field gradient pattern at said substrate to cause said magnetic ink particles to locally wet said paper in accordance with said pattern.

30. The apparatus as set forth in claim 29 wherein said substrate is paper.

31. The apparatus as set forth in claim 30 wherein said means to produce a magnetic field gradient pattern is on the side of said paper opposite to the side thereof exposed to said micromist of magnetic ink particles.

32. The apparatus as set forth in claim 31 wherein said means to produce a magnetic field gradient pattern include magnetic write head means having individually addressable electromagnets.

33. The apparatus as set forth in claim 32 wherein said means to produce a magnetic field gradient pattern include magnetizable media means selectively addressable by said individually addressable electromagnets.

34. Apparatus for selectively depositing particles comprising:

substrate means including movable paper means upon which said particles are to be selectively deposited;

means for generating a magnetic micromist of nebulized ink particles of particle size in the submicron to 30 micron range so as to not wet said substrate means in the absence of a magnetic field thereat when said substrate means is exposed thereto; and means to selectively provide a magnetic field gradient at said substrate means including magnetic write head means of multiple electromagnets individually addressable and positioned on the side of said substrate means which is opposite to the side thereof exposed to said micromist so as to thereby cause said micromist to locally wet said substrate means in accordance with said magnetic field gradient.

* * * * *